(12) United States Patent
Perez et al.

(10) Patent No.: US 10,505,796 B2
(45) Date of Patent: Dec. 10, 2019

(54) NETWORK FUNCTION VIRTUALIZATION

(71) Applicant: Hewlett Packard Enterprise Development LP, Houston, TX (US)

(72) Inventors: Ignacio Aldama Perez, Alcobendas (ES); Ruben Sevilla Giron, Alcorcon (ES); Norman Kincl, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 193 days.

(21) Appl. No.: 15/319,463

(22) PCT Filed: Jun. 25, 2014

(86) PCT No.: PCT/US2014/044160
§ 371 (c)(1),
(2) Date: Dec. 16, 2016

(87) PCT Pub. No.: WO2015/199685
PCT Pub. Date: Dec. 30, 2015

(65) Prior Publication Data
US 2017/0324612 A1   Nov. 9, 2017

(51) Int. Cl.
*H04L 12/24*  (2006.01)
*G06F 9/445*  (2018.01)
*H04L 29/08*  (2006.01)

(52) U.S. Cl.
CPC ........ *H04L 41/0806* (2013.01); *G06F 9/445* (2013.01); *H04L 41/0893* (2013.01); *H04L 67/34* (2013.01); *H04L 41/00* (2013.01)

(58) Field of Classification Search
CPC ... H04L 41/0803–0806; H04L 41/0893; H04L 67/34; H04L 41/00; G06F 9/445
See application file for complete search history.

(56) References Cited

U.S. PATENT DOCUMENTS

| | | |
|---|---|---|
| 2009/0222542 A1 | 9/2009 | Miyajima |
| 2011/0239216 A1 | 3/2011 | Miyajima et al. |
| 2013/0074066 A1 | 3/2013 | Sanzgiri et al. |
| 2014/0003284 A1 | 1/2014 | Doyle et al. |
| 2014/0086177 A1 | 3/2014 | Adjakple et al. |

FOREIGN PATENT DOCUMENTS

WO   WO-2013122597   8/2013

OTHER PUBLICATIONS

Basilier, H. et al., Virtualizing Network Services—The Telecom Cloud, Ericsson Review, The communications technology journal since 1924, Mar. 28, 2014, 10 pages.
ETSI, "Network Functions Virtualisation (NFV). Use Cases", ETSI GS NFV 001 v1.1.1, Oct. 2013, 50 pages.
ETSI, Network Functions Virtualisation (NFV): Architectural Framework:, ETSI GS FV 002, v1.1.1 Oct. 2013, 21 pages.
(Continued)

*Primary Examiner* — Eric Myers (57) ABSTRACT

Examples for network function virtualization are described. These examples include accessing definition data defining a virtual network function, the virtual network function comprising one or more components. The definition data is then instantiated to generate an instance of the virtual network function. Physical computing resources may then be assigned to the instance of the virtual network function.

20 Claims, 5 Drawing Sheets

(56) References Cited

OTHER PUBLICATIONS

Intel, "End-to-End NFV—vEPC Service Orchestration", Intel Network Builders Reference Architecture, 2014, 24 pages.
International Searching Authority, "Notification of Transmittal of the International Search Report and the Written Opinion", PCT/US2014/044160, dated Feb. 24, 2015 13 pages.
White Paper, "Network Functions Virtualization—Challenges and Solutions", At the Speed of ideas, 2013, 20 pages.

NETWORK FUNCTION VIRTUALIZATION

BACKGROUND

Network function virtualization is an emerging design approach for constructing Information Technology applications, particularly in the telecommunications industry. The classical approach to network architecture is based upon fragmented, purpose built hardware for implementing network functions—also known as physical network functions (e.g. firewalls, deep packet inspectors, network address translators) which require physical installation at every site at which they are needed. In contrast, network function virtualization aims to consolidate many network equipment types onto, for example, standardised high volume servers, switches, and storage through the implementation of virtual network functions in software which can run on a range of standard hardware. Furthermore, network function virtualization aims to transform network operations because the virtual network functions can be dynamically moved to, or instantiated in, various locations in the network as required without the need for installation of new hardware. Furthermore, multiple physical network functions and virtual network functions can be configured together to form a 'service-chain' and packets steered through each network function in the chain in turn.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Certain examples described herein provide a method to provide network function virtualization, sometimes referred to in the art as "on-boarding". Certain examples described herein provide a three stage process of definition, instantiation and assignment to implement a virtual network function. In certain cases this enables a virtual network function to be implemented using a combination of virtual machines and physical servers, as well as enabling virtual network functions to be composed of other virtual network functions in turn. It may also allow guaranteed exclusivity for defined resources, such as network bandwidth.

Figure 1:
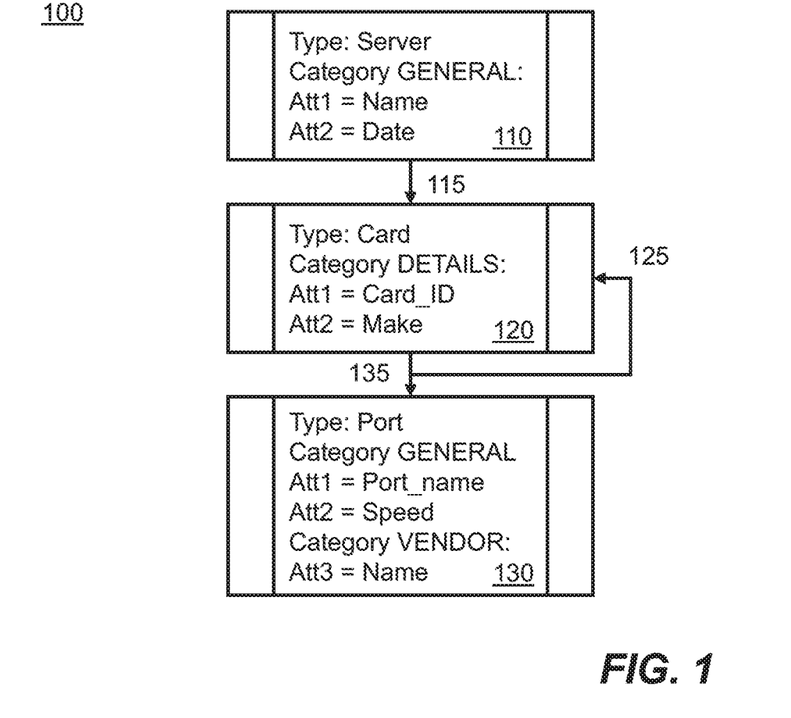
FIG. 1 is a schematic diagram showing a first data definition derived from a data model for implementing a virtual network function according to an example.

FIG. 1 shows components of a first data definition for implementing a virtual network function according to an example. The components have been derived from a data model. The data model may be used to define one or more of a data definition, a template and an instance of a virtual network function. The data model uses two model components. In one implementation, these model components may be class definitions in a selected programming language, for example Java® master beans, and/or may be save as eXtendable Mark-up Language (XML) data. In the present example, the two model components comprise an artifact definition and a relationship definition. In selected cases, these two model components alone may be extended to implement each of the components of one or more of a data definition, a template and an instance of a virtual network function.

In one case, an artifact definition comprises a definition of an entity of any type, e.g. may define an object in an object orientated environment. For example, an artifact definition may be extended to define an electronic entity in a network such as a virtual core, virtual machine, network port, network card etc. Alternatively, an artifact definition may be extended to define a set of one or more constraints of a template, e.g. a set of constraints to apply to the instantiation of a virtual network port. In FIG. 1 there are three components defined using an artifact definition: a server component 110, a card component 120 and a port component 130. These components may define the characteristics of one or more of a virtual component and a physical component. For example, card component 120 may model a virtual network card or a physical network card. Each artifact definition may have a number, e.g. one or more, of attributes. An attribute may be used to define a key-value pair in an instance of a component of a virtual network function. For example, the server component 110 of FIG. 1 has two attributes: 'Name' and 'Date' representing the server name and the date of generation or build. The card component 120 also has two attributes: 'Card_ID', representing an identification number for a network card, and 'Make', representing a make or model number of the network card. Lastly, the port component 130 has three attributes: 'Port_name', representing a name of a network port, 'Speed', representing a speed (e.g. in Mbps or Gbps) of a network port and 'Name', representing a name of a manufacturer of the network port. In the example of FIG. 1, attributes are also grouped by category. The attributes of the server component 110 are grouped under a 'GENERAL' category; the attributes of the card component 120 are grouped under a 'DETAILS' category; and the first two attributes of the port component 130 are grouped under the category 'GENERAL' and the third attribute of the port component 130 is grouped under the category 'VENDOR'.

In one case, a relationship definition comprises a definition of a relationship between one or more artifacts. For example, this may comprise a parent-child relationship. In the example of FIG. 1 there are three relationships. A first relationship 115 indicates that the server component 110 is the parent of the card component 120, e.g. a modelled server may has a modelled network card. A second relationship 125 indicates that the card component 120 may be a parent of another card component 120, e.g. a modelled network card may comprise one or more network cards that are nested in a recursive manner. A third relationship 135 indicates that each card component 120 is the parent of a port component 130, e.g. each modelled network card has a modelled network port. A relationship can also have any number of attributes. A relationship may have a relationship type, which may be defined as an attribute or as a separate property. For example, one of the relationships 115, 125 and 135 may have a relationship type that may be defined as 'PHYSICALLY_CONTAINS'.

Figure 2:
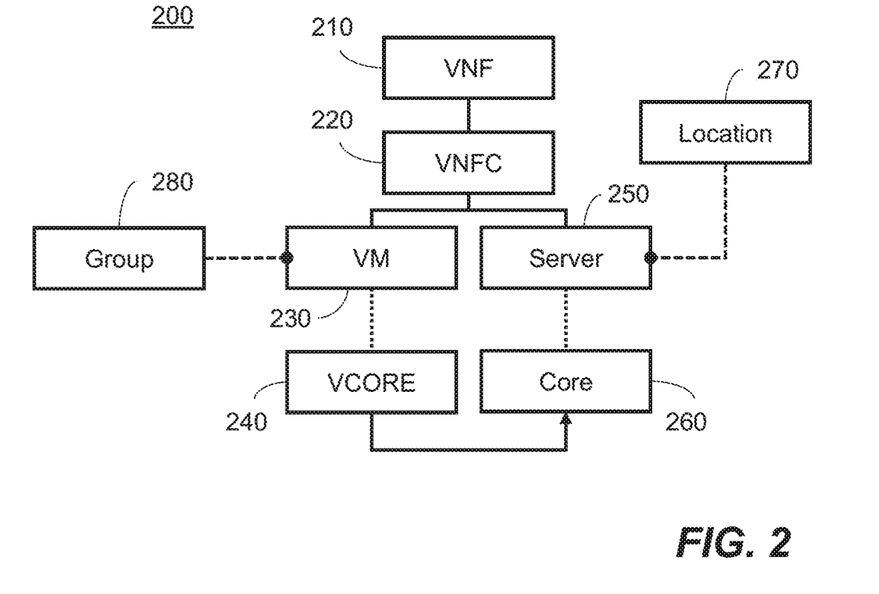
FIG. 2 is a schematic diagram showing a second data definition according to an example.

FIG. 2 shows another example of a data definition 200 for a virtual network function that is constructed from the elements of the data model described above. An artifact definition of type "VNF" 210, representing a virtual network function, is first generated. This VNF definition 210 then comprises at least one virtual network function component, which is defined by the "VNFC" artifact definition 220. A relationship definition between the VNF definition 210 and the VNFC definition 220 is shown by the line connecting blocks 210 and 220 in FIG. 2; within data representing the data definition 200 the relationship definition may be stored as references to data representing the VNF and VNFC definitions. The relationship type of this relationship definition may be "has" or "formed from". In the example of FIG. 2, there are two defined virtual network function components: virtual machine ("VM") 230 and server 250. Each of the VM and server components has a relationship with the VNFC definition 220. This relationship may be modelled as a relationship definition of a type "is a type of". The VM component definition 230 then has a relationship with a definition of one or more virtual cores 240. This relationship may be modelled as a relationship definition of a type "contains" or "comprises one or more of". Similarly, the server component definition 250 then has a relationship with a definition of one or more physical cores 260. This relationship may also be modelled as a relationship definition of a type "contains" or "comprises one or more of". The server component definition 250 may comprise data that defines one or more characteristics of a physical server. In FIG. 2, the server component 250 has a relationship with a location definition 270. The location definition 270 may define one or more characteristics of a physical location, e.g. address and/or geo-spatial coordinates. These may be defined as attributes of the location definition 270. The relationship between the location definition 270 and the server component 250 may be modelled as a relationship definition of a type "has" or "is located at".

In the example of FIG. 2, there is a relationship definition that defines a relationship between the physical core definition 260 and the virtual core definition 240. This relationship definition may be of a type "uses" or "implements", i.e. a virtual core component is implemented upon or using a physical core of a server computing device. In FIG. 2, there is also a group definition 280. The group definition 280 may also be based on the artifact component of the data model and may represent a particular grouping of components. In FIG. 2, the group definition 280 has a relationship with the VM definition 230. This relationship may have a relationship definition of the type "belongs to", e.g. a virtual machine may belong to a particular group.

The data definition of FIG. 2 may be stored, for example as XML data, e.g. in one or more XML files. The definitions 210-280, which may be derived from an artifact component, may be stored as a set of XML tags, e.g. in a nested hierarchy. Relationship definitions detailing possible relationships between the definitions 210-280 may be stored, as examples, as further nested tags, links or references. For example, each definition (artifact and/or relationship) may comprise an identifier (ID) that may be used to effect the links or references. Alternatively, other tables and similar data structures may be used to implement the data definition 200.

In general, the data definition 200 of FIG. 2 sets out the possible types of artifacts and their attributes along with the possible types of relationships and their attributes. The data definition 200 also defines which artifact can be a parent of another artifact. As can be en in FIG. 2, a virtual network function is defined as having one or more virtual network function components. In the specific example of FIG. 2, the virtual network function components comprise a set of virtual components (a set of virtual machines) and a set of physical components (a set of servers). In the example of FIG. 2, each of these virtual and/or physical components then have further sub-components (virtual cores and cores respectively), wherein the physical components are used to implement the virtual components. Defining both virtual and physical components according to the same data model or schema provides advantages when the data definitions are instantiated that are discussed in more detail below.

The data definition 200 in FIG. 2 is an example of one particular virtual network function. Other virtual network functions may share a similar high level structure, such as definitions 210 and 220. Alternatively, in other examples, the VNF definition 210 may itself by the parent of one or more other VNF definitions, network models, condition definitions and/or action definitions. Similarly, a VNFC definition 220 may be a parent of a further VNFC definition. A virtual machine definition 230 may be a parent of, amongst others, one or more of the following component definitions: virtual memory: virtual disk; virtual logical unit number (LUN) device; and a virtual port. Similarly, a server definition 230 may be a parent of, amongst others, one or more of the following component definitions: central processing unit; card; disk; and LUN device. Data definitions may model one or more network links based on an artifact component; these links may be children of a VNF definition.

The data definition 200 of FIG. 2 defines what type of relationships are possible between artifacts. Although not shown, for certain virtual network function definitions, it is possible for an artifact to have two or more relationships with each relationship having a different type. For example, VM component 230 may have a relationship of type "CONTAINS" with VCORE component 240, wherein the VM component 230 is the parent of the child VCORE component 240. VCORE component 240 then has a relationship of type "USES" with Core component 260. These defined relationships and their types constrain an instantiated instance of the data definition 200; for example, a "USES" relationship may require a resource allocation. Using a grammar analogy, artifact definitions be thought of as the "nouns" of the definition while the relationships may be thought of as the "verbs"; in this analogy the parent of the relationship would be the "subject" and the child would be the "object". The definitions define not just the grammar (for example requiring 'subject' 'verb' 'object') but the specific definitions of which 'nouns' can be used as 'subject' with which 'verbs' and which 'objects'. A data model described according to certain examples defines all relationships in a common manner, while still identifying distinctions in the types of relationships in order to control behaviour.

Figure 3:
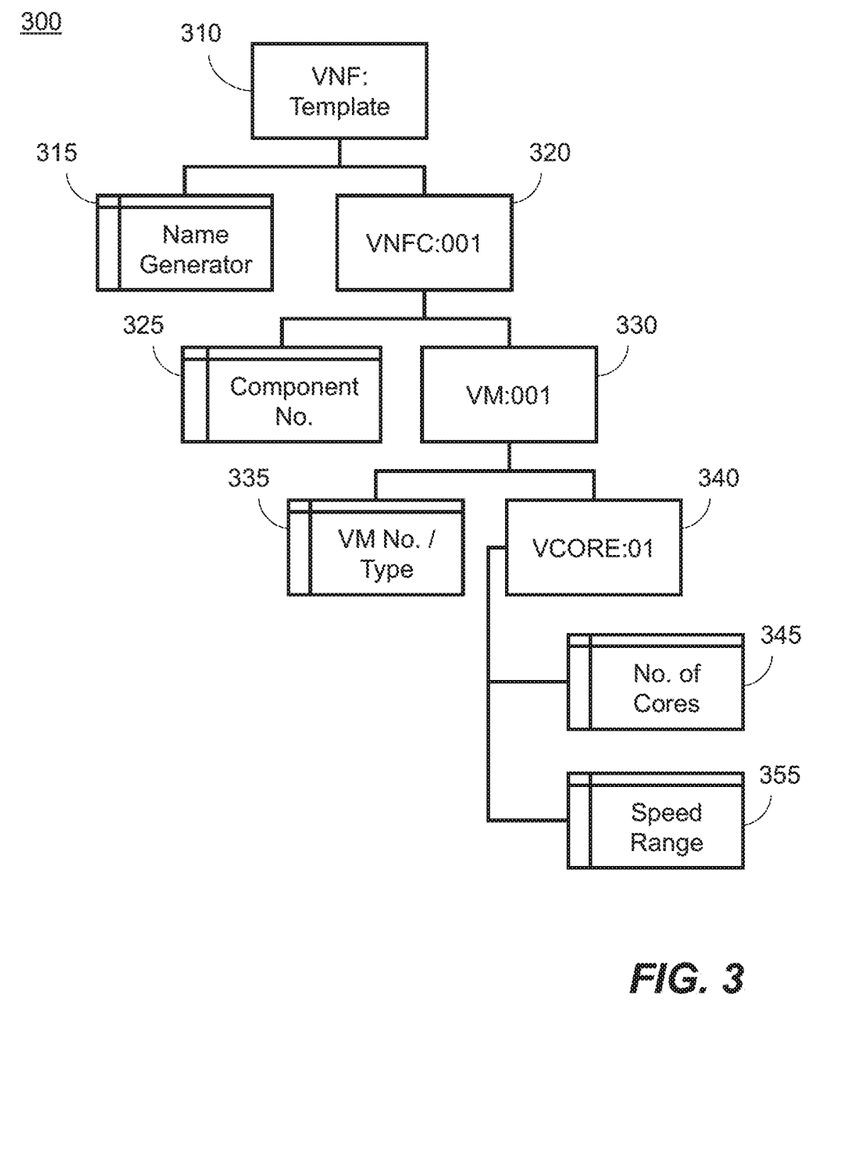
FIG. 3 is a schematic diagram showing a template according to an example.

FIG. 3 shows an example of a template 300 according to an example. The template 300 may be used to set one or more constraints on the instantiation of a component defined in the data definition. Elements of the template 300 may be defined based on the same artifact and relationship data model used to define data definition 200. A template may have one or more policies that set behaviour when creating an instance of a virtual network function, e.g. that set one or more limits or constraints on the data generated to represent the instance. In the present example, the template 300 is generated by partially instantiating the data definition 200 and applying one or more policies to each instantiated component.

Turning to FIG. 3, the template 300 comprises a first node 310 that sets the template as a virtual network function ("VNF") template. Each node may be based on an artifact component from the data model. The VNF template node 310 may be generated by partially instantiating the VNF definition 210 of FIG. 2. The VNF template node 310 has a name generator policy 315, as set by the relationship definition indicated by the line in FIG. 3. The name generator policy 315 sets one or more constraints on the name of an instance of a virtual network function, e.g. constrains the name of a fully instantiated version for the VNF definition 210 of FIG. 2.

The template 300 comprises a second node 320 that comprises a partial instantiation of VNFC definition 220 from FIG. 2. The VNFC template node 320 has a component number policy 325, as set by the relationship definition indicated by the line in FIG. 3. The component number policy 325 sets one or more constraints on the number of virtual network function components that are instantiated from VNFC definition 220. For example, one constraint may comprise that there may only be between 0 and 5 virtual network function components that are instantiated based on VNFC definition 220.

The template 300 also comprises a third node 330 that comprises a partial instantiation of VM definition 230 from FIG. 2. The VM template node 330 has a virtual machine number and type policy 335, as set by the relationship definition indicated by the line in FIG. 3. The virtual machine number and type policy 335 sets one or more constraints on the number and type of virtual machines that are instantiated from VM definition 230. For example, one constraint may comprise that there may only be between 0 and 10 virtual machines that are instantiated based on VM definition 230, and that each virtual machine needs to be one of a set of defined types.

Lastly in this example, template 300 comprises a fourth node 340 that comprises a partial instantiation of VCORE definition 240 from FIG. 2. The VCORE template node 340 has two policy nodes 345 and 355, as set by the relationship definitions indicated by the lines in FIG. 3. The first policy node 345 sets one or more constraints on the number of virtual core instances that may be generated. The second policy node 355 sets one or more constraints on the speed of instantiated virtual core instances, e.g. a virtual core may be limited to a speed range of 200 to 400 MHz or 700 to 1200 MHz.

Figure 4:
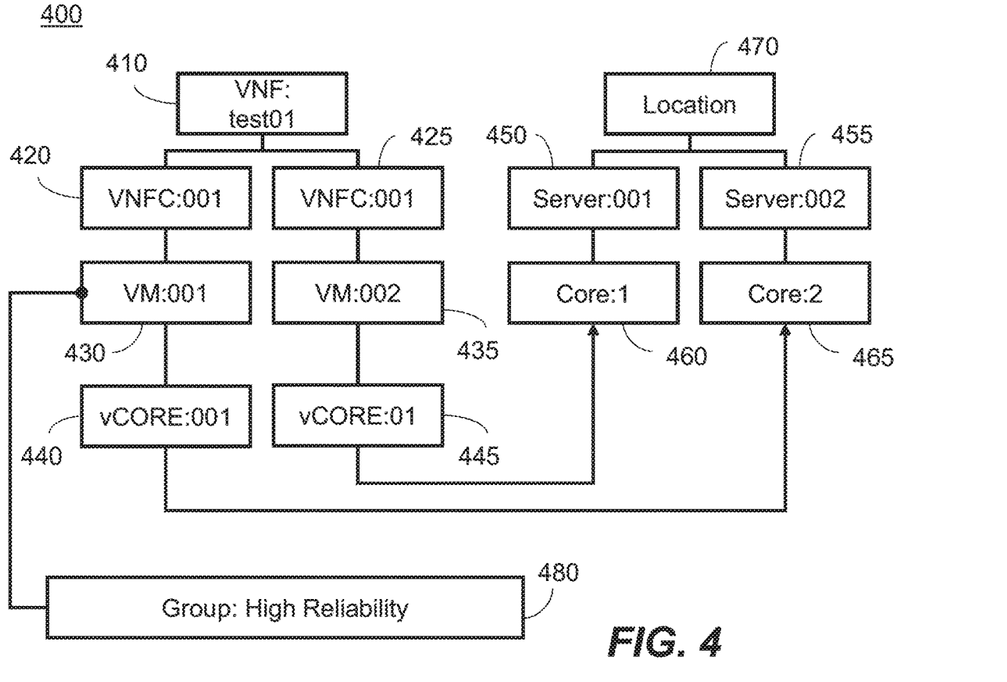
FIG. 4 is a schematic diagram showing an instance of a virtual network function according to an example.

FIG. 4 shows an example of a virtual network function instance 400 that may be generated based on the data definition 200 of FIG. 2 and the template 300 of FIG. 3. In this case, the data definition 200 is instantiated and the constraints of the template 300 are applied to generate the virtual network function instance 400. Instantiation may comprise generating one or more classes or modules from a general class and setting any defined attribute values. For example, in an object-oriented programming language an instance may comprise a specific realization of an object defined by a class. Each instance has a distinct identity, e.g. is a distinct data entity.

A first component 410 of the instance 400 sets the instance as a form of virtual network function based on VNF definition 210. For example, the instance 400 may comprise one or more instantiated classes in a programming language. Any attributes that are defined as part of the VNF definition 210 may be populated with values to generate the first component 410. The first component 410 is also generated according to the name generator policy 315: for example, the name generator policy may require the first component to have a name with no spaces or special characters beginning with "VNF:", such as "VNF:test01" as shown in the Figure.

In FIG. 4, two instances VNFC:001 420, 425 of the VNFC definition 220 are generated. The component number policy 325 is applied to the generation of the instances 420, 425 and the numbers of instances (2) is within the defined policy range (0 to 5). Each VNFC instance 420, 425 has a corresponding virtual machine (VM) instance 430, 435 that is set based on the VM definition 230 and the associated relationship definitions of FIG. 2. Again the VM instances 430, 435 are instantiated to comply with the virtual machine number and type policy 335. Similarly, each VM instance 430, 435 has a corresponding virtual core ("vCORE") instance 440, 445 representing a virtualised central processing unit core used by a virtual machine. The vCORE instances 440, 445 are instantiated to comply with policy nodes 345 and 355.

Components 420 to 445 represent virtual components of a virtual network function. FIG. 4 also shows instances that are generated to represent physical components. For example, FIG. 4 shows a location instance 470 that is generated based on location definition 270. The generation of a location instance in this case may comprise generating a data structure representative of the location whose attributes are populated with values representing the location, such as geo-spatial coordinates. Two server instances 450 and 455 are also generated based on server definition 250. The server instances may comprise an instance of server component 110 with attribute values tying the instance to a particular physical server. Each server instance 450, 455 has a corresponding core instance 460, 465. The core instances 460, 465 represent a physical central processing unit core that is present in each of the servers represented by server instances 450, 455.

As demonstrated by comparing FIGS. 2 and 4, each data definition component may have zero or more related instances. Different instances of the same data definition component may have different or equal values for each attribute. When creating an instance using a template, instance components will be created for each artifact and relationship defined in the template and any policy restrictions will be applied. The resultant instance may also be validated to ensure it and its components are valid in respect of any defined policy rules FIG. 4 also shows how an assignment of physical computing resources may be performed. In FIG. 4 each of the VCORE instances 440 and 445 are assigned to a corresponding physical core instance 460, 465 in line with the relationship definition set out in FIG. 2. For example, VCORE instance 440 is to be implemented by core 1 on server 1 as represented by core instance 460 and VCORE instance 445 is to be implemented by core 2 on server 2 as represented by core instance 465.

Figure 5:
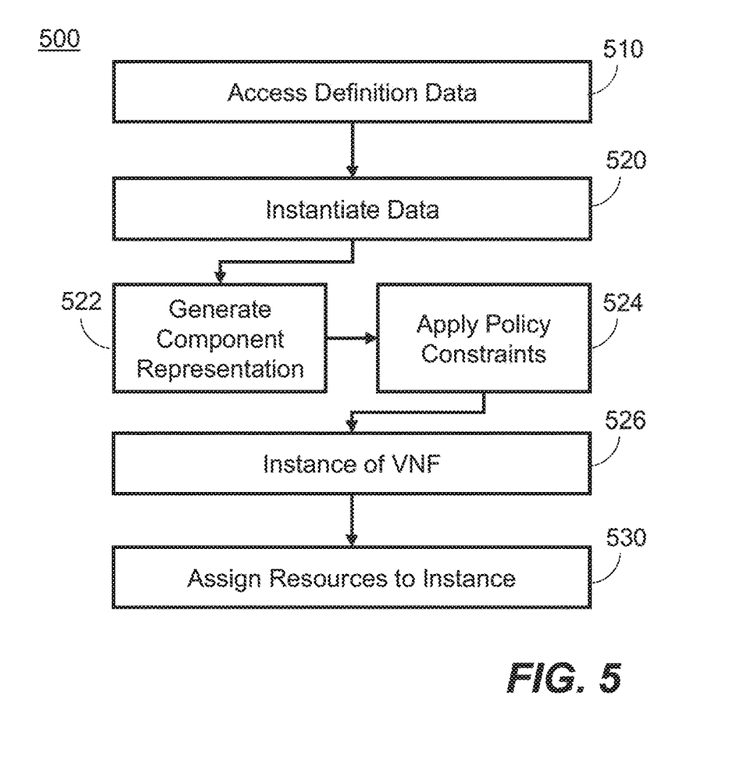
FIG. 5 is a flow diagram showing a method according to an example.

FIG. 5 shows a method 500 of provisioning a virtual network function. The method may be applied to the data illustrated in FIGS. 2 to 4.

At block 510 definition data for a virtual network function is accessed. The definition data may comprise one or more of the data definition 200 and the template 300. The definition data may comprise data modelling a number of components, wherein the data may be modelled using an XML data structure. Components may be dynamically added, removed and/or edited within the definition data, e.g. may be changed after an initial generation time. The definition data, for example template data as shown in FIG. 3, may also provide rules to define the limits of any given virtual network function. For example, these rules may define maximum and/or minimum memory (e.g. amounts of random access memory) to assign to a particular component and/or a maximum and/or minimum number of components of a given type. The definition data may be defined based on an artifact and relationship model that provides the flexibility to describe all components with a network functions virtualization, including virtual and physical components. The definition data may be defined manually, e.g. by setting values and arrangements based on manual input, or automatically, for example automatically populating values based on known or desired network infrastructure using a loading tool.

After accessing the definition data at block 510, the definition data is instantiated at block 520. This block may be performed in response to a request to provision, i.e. deploy, a particular virtual network function. At block 520 the definition data is processed to generate the instance. In relation to FIGS. 2 to 4, this may comprise processing a data definition 200 and a template 300 to generate an instance 400. At block 522, each component of the data definition, e.g. each node based on an artifact, is processed in a recursive manner. A representation is generated, which may comprise a partially instantiated object in an object oriented programming environment. At block 524, any constraints and limits set in the data definition are applied, e.g. via nodes of a policy template. This may result in an internal representation of each component, e.g. component instances 410 to 480 of FIG. 4. The application of any constraints may complete the instantiation process for that component. After all components of the virtual network function have been instantiated an instance of the virtual network function is said to exist, e.g. such as instance 400 shown in FIG. 4.

At block 530, the method attempts to assign appropriate physical resources to the internal representations or instances generated at block 520. This may comprise locating appropriate physical computing resources to assign to either physical or virtual component instances, such as those illustrated in FIG. 4. In one case, resources are reserved and assigned only after internal representations of all components have been generated, e.g. only after the instance 400 shown in FIG. 4 has been generated.

The above case may be compared to comparative systems wherein resources are assigned at the moment that an internal representation is created for each component, e.g. in this comparative case resources may be assigned when component instance 440 is created but before component instance 445 is generated. This comparative case can lead to problems as it may not be possible to ensure that an internal representation or instance meets any required constraints and at the same time may be implemented in a given physical environment. These problems may be compounded if several provisioning requests are being processed in parallel.

For example, a virtual network function may need to meet the following example constraints of: having three virtual machines where those virtual machines cannot be located in the same server and where the physical cores assigned to each virtual machine must be dedicated and not shared with anyone else. These constraints may be required to ensure a given processing level, e.g. a given level of reliability or a given speed of response. If, in a comparative case, virtual machines are instantiated and assigned resources separately then a virtual network function instance may have three virtual machines in the same server. Moreover, if the request is received in parallel with other requests the same physical core may end up being assigned to virtual machines of different virtual network function instances. In these cases the constraints cannot be met. Also in some cases, the first two virtual machines may be able to be assigned resources that meet the constraints but it may not be possible to do this for the third virtual machine, requiring a rollback of the reservation of resources for the first two virtual machines. This can be costly in terms of time and physical computing resources.

However, by assigning resources according to certain examples described herein, e.g. by separating the provision process into three separate blocks or processes, it can be ensured that all conditions are met. For example, if it is discovered that three virtual machines cannot be instantiated then time need not be spent looking for appropriate resources.

Having an assignment as a separate process allows enables the use of different assignment behaviours. For example, different assignment logic may be applied at block 530 to a common instance generated at 520. Because the instance is based on a common virtual network function, assignment rules, such as the priority of the service or the amount of resources to use may vary with different circumstances or implementations. Also once a full internal representation is generated, e.g. the complete instance with all instantiated components as shown in FIG. 4, it is easy to locate resources and block them if they need to be exclusive, allowing exclusive resource use between virtual network functions.

In one case a state of physical computing resources, e.g. the state of one or more physical servers, may be maintained in memory. In this case, assigning physical resources may comprise determining if the state of physical computing resources is able to meet the requirements of a generated virtual network function instance. For example, by applying template constraints to a data definition a virtual core may be instantiated as an object requiring 1024 MB of random access memory. If the state of the physical computing resources indicate this is not available then resources are not available and a request to provision the virtual network function cannot be met, e.g. may be declined. If the state of the physical computing resources indicate this is available then resources may be reserved and the virtual network function provisioned.

In one case, one or more of customer-specific and service-specific rules may be applied by way of at least one of the template constraints and the assignment logic. In this manner different requests to provision a virtual network function may be met differently depending on the template and/or assignment logic that is used. For example, for a first request relating to a first customer or service, a first template and/or first set of assignment logic may be used while retaining a common data definition. This results in the provision of a first virtual network function. For a second request relating to a second customer or service, a second template and/or second set of assignment logic may be used. This results in the provision of a second virtual network function that is based on a common data definition but that is different from the first virtual network function. For example, a virtual network function may comprise a load balancer that has a data definition setting out possible components. For a high availability service, e.g. relating to voice over internet protocol calls, a template and/or set of assignment logic may be used that ensures a load balancer with high availability (e.g. by using virtual cores on distinct physical servers and/or by using a larger amount of memory). For a service where availability is less important, e.g. a cheaper machineto-machine communications network, a template and/or set of assignment logic may be used that allows a load balancer to use fewer physical resources.

Figure 6:
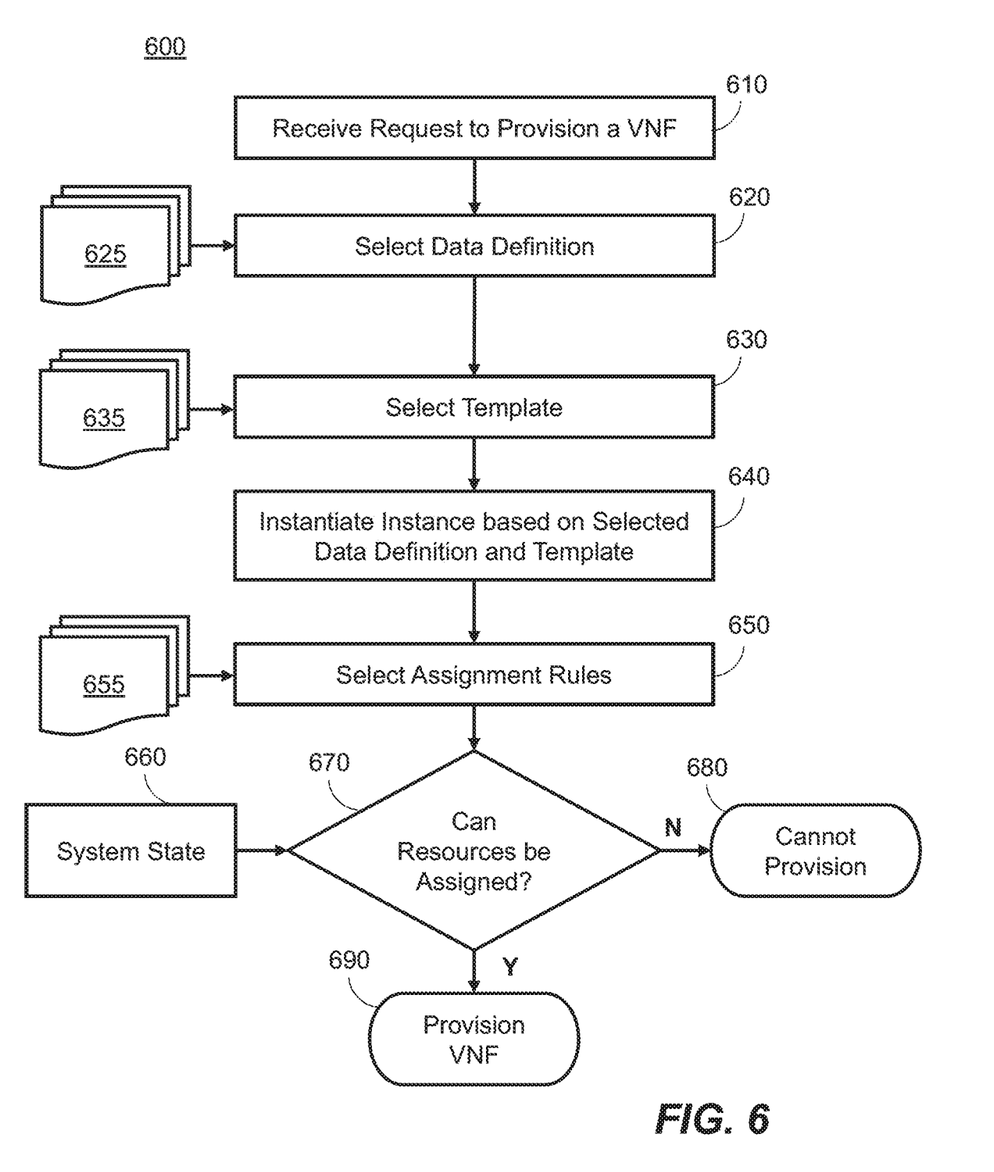
FIG. 6 is a flow diagram showing a further method according to an example.

FIG. 6 shows another method 600 of provisioning a virtualised network function according to an example. At block 610 a request to provision a virtualised network function is received. This request may be received over a network, e.g. from a customer over the Internet or a user over a local area network. At block 620, a data definition 625 is selected. For example, the request may explicitly identify a particular virtualised network function, whose data definition 625 may be retrieved from a set of data definitions for a plurality of respective virtualised network functions. In another case, a request may be paired with a particular virtualised network function by way of configurable selection logic. At block 630 a template 635 is selected. Each data definition 625 for a particular virtualised network function may have a plurality of associated templates 635. Templates 635 set out a number of constraints that define a policy, as for example described above. A particular template 635 associated with a data definition 625 may be selected according to one or more characteristics of the request. For example, each customer may have one or more associated templates, and/or each type of server may have a set of associated service constraints (e.g. high availability, low computation cost, fault tolerant etc.). At block 640, an instance of the virtualised network function is generated based on the selected data definition 625 and template 635. Once, an instance is generated, a set of assignment rules 655 are selected at block 650. These assignment rules 655 determine how a set of physical resources are to be assigned to the instance. At block 660, a system state is obtained. This may be achieved by measuring a resource state of one or more physical server systems, such as available central processing units and/or memory. At block 670, the assignment rules 655 selected at block 650 are applied to the instantiated instance of the virtual network function. Here it is determined whether resources can be assigned, given the system state from block 660. If there are not available resources to meet the assignment rules and the instance requirements then the request may be declined at block 680; the virtual network function cannot be provisioned. If there are available resources to meet the assignment rules and the instance requirements then the request may be accepted at block 690: the virtual network function can be provisioned. At block 690 the required resources may be reserved before activating the instance of the virtualised network function. As method 600 of FIG. 6 shows, each request for a common virtualised network function may result in the selection of different templates 635 and/or assignment rules 655.

Figure 7:
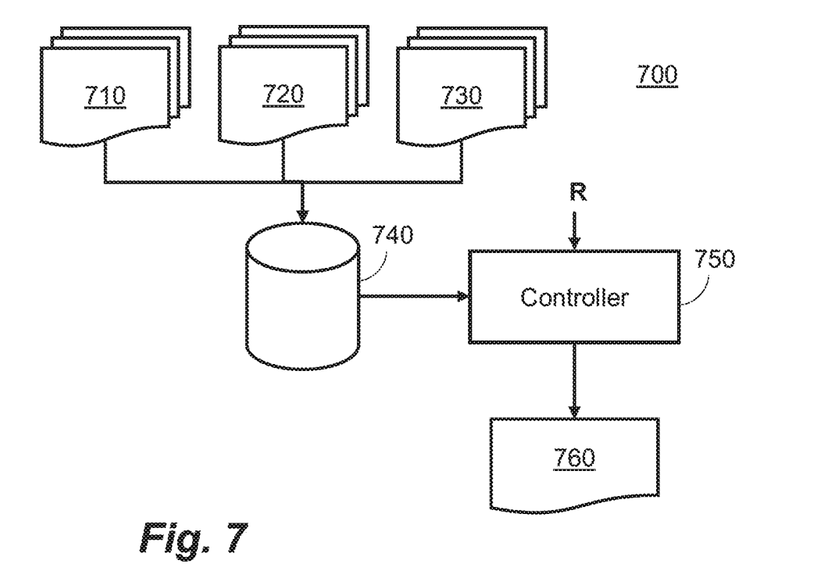
FIG. 7 is a schematic diagram showing a system for provisioning a virtualised network function.

FIG. 7 shows an example system 700 for provisioning a virtualised network function. The system comprises a set of virtualised network function definitions 710, a set of policies or templates 720, and a set of assignment logic 730. In FIG. 7, these items of data are stored on a storage device 740 that is accessible to a controller 750. In other implementations there may be more than one storage device; the items of data need not be stored on the same device. The controller 750 is arranged to receive a request R and accordingly access definitions 710, policies 720 and logic 730. From these a particular definition 710, policy 720 and set of logic 730 is selected by the controller 750, e.g. based on the contents of the request. The controller 760 then generates an instance of an appropriate virtual network function 760 and assigns computing resources to implement the instance.

Certain examples described herein may provide a number of advantages over comparative cases. By using a three-stage process complexity can be simplified—the data definition may be generated and instantiated separately from the assignment of resources. Time may be saved if it is determined that virtual network function preconditions are not met as a subsequent resource location stage may be avoided. The reservation of physical computing resources is also improved; resources may be reserved in blocks that represent the required resources for a complete instance including all components, as opposed to reserving resources in a piecemeal manner as each component is instantiated. Using definition data that incorporates both physical and virtual components based on a generic representation enables the example methods, and any system that provisions virtual network functions based on the methods, to process those components in a common manner. In this case, differences are only introduced at the assignment stage where different rules can be applied based on the type of component. Certain examples described herein are thus able to work with mixtures of virtualized and physical functions and components based on a common model, while at the same time ensuring resource exclusivity. This can provide benefits for migration of existing physical infrastructure to a virtualized solution; for example components may be virtualized one at a time while retaining a mixture of physical and virtual components. Certain examples are also able to reserve resources for a complete virtual network function definition.

Certain examples described herein may be applied to provision a new virtual network function as part of a network function virtualization. They provide a method of processing a provisioning request from the moment the request is triggered and received to the moment where all the components of the virtual network function are deployed and properly configured. Certain examples described herein address the fact that a virtual network function may contain several components, for example some being virtual, some being non-virtual and some even being other virtual network functions; wherein each component may need a different configuration of resources, such as (amongst others) disk use, processor use, memory, bandwidth, and the components may need to be connected to one another.

Certain examples described herein provide improvements over a comparative approach wherein a virtual network function has only a single virtual machine and there is no need to control from where computing resources are taken or to configure those resources for exclusivity. While this comparative approach may be suitable for traditional information technology applications it is sub-optimal for network function virtualization.

The use of templates and policies in certain examples also provide an elegant solution to a problem of scaling a virtual network function. For example, a virtual load balancer may be initially defined. It may then be first instantiated to have one virtual machine with two virtual cores. This may be found to need scaling up due to load demands. It may thus be attempted to instantiate a scaled-up version of the virtual load balancer with an additional virtual network function component in the form of an additional virtual machine with three virtual cores. In this case, during the instantiation, the constraints of any template will be applied. If the scaled-up version is possible the constraints will be met. If this is not possible another configuration may be tried, e.g. adding another virtual core to the existing virtual machine and the policy applied again.

Certain examples described herein may be implemented by way of a network function virtualization director or orchestrator. In certain cases networks and network links may also be defined to model network and traffic flow between network functions. These may use a suitable graph model. A network function virtualization orchestrator may, for example, run as software on a physical or virtual server (not shown) to operate, manage and automate the software and infrastructure associated with network function virtualization resources in order to implement a defined service model. A network function virtualization orchestrator may have control and visibility of all network functions including their physical, virtual or logical network interface ports. Examples of virtual network functions include functions for providing security for example implemented as a firewall, packet filtering, gathering of statistics, caching, access points and gateways.

Figure 8:
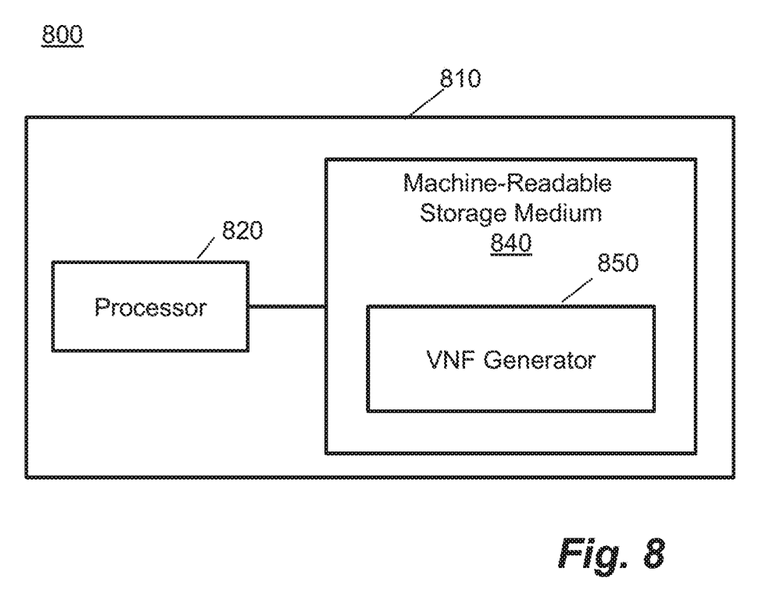
FIG. 8 is a schematic diagram showing a processing system according to an example.

FIG. 8 depicts example components of a processing system 800, which in one example, may be arranged to implement the examples described herein. The processing system 800 a computing device 810 comprises one or more processors 820 that are arranged to execute virtual network function generator instructions 850 stored in a machine-readable storage medium. Processor 820 can include a microprocessor, microcontroller, processor module or subsystem, programmable integrated circuit, programmable gate array, or another control or computing device. The storage medium (or storage media) 840 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

What is claimed is:

1. A method comprising:
   accessing definition data defining a virtual network function, the definition data comprising a plurality of object definitions representative of a plurality of components of the virtual network function;
   instantiating the definition data to generate an instance of the virtual network function, including:
      generating a representation of each of the plurality of components based on a respective one of the plurality of object definitions; and
      applying one or more policy constraints to at least one of the generated representations to generate the instance; and
      applying assignment logic to the generated instance to assign physical computing resources to the virtual network function,
   wherein instantiating the definition data further includes:
      for a first request to provision the virtual network function, applying a first set of policy constraints to at least one of the generated representations; and
      for a second request to provision the virtual network function, applying a second set of policy constraints to at least one of the generated representations.

2. The method of claim 1, wherein applying assignment logic comprises:
   for a first request to provision the virtual network function, applying a first set of assignment logic to the generated instance; and
   for a second request to provision the virtual network function, applying a second set of assignment logic to the generated instance.

3. The method of claim 1, wherein applying assignment logic to the generated instance comprises:
   obtaining state information for one or more physical servers; and
   determining if the state information meets the requirements of the generated instance with the one or more applied policy constraints.

4. The method of claim 1, wherein assigning physical resources to the instance of the virtual network function comprises:
   assigning one or more physical servers to implement one or more physical components; and
   assigning one or more virtual machines operating on one or more physical servers to implement one or more virtual components.

5. The method of claim 1, wherein the definition data comprises:
   one or more artifact definitions, an artifact comprising an entity in a data model, each artifact definition comprising values for one or more attributes of the artifact; and
   one or more relationship definitions representing a relationship between the one or more artifacts,
   wherein each component is defined as an artifact of a specific type having one or more relationships of a specific type.

6. The method of claim 1, wherein generating a representation of each of the plurality of components based on a respective one of the plurality of object definitions comprises recursively generating such that at least one of the respective one of the plurality of object definitions includes a same object nested in a recursive manner.

7. The method of claim 1, wherein the plurality of object definitions include a plurality of artifact definitions representative of the plurality of components of the virtual network function and one or more relationship definitions representative of one or more relationships between the plurality of components, the method further comprising:
   using a first template defining one or more limitations to be applied to the definition data to generate the instance of the virtual network function;
   applying one or more assignment rules defining how physical resources are to be applied to the instance of the virtual network function; and
   using a controller to:
      receive a request to provision the virtual network function; and in response to receiving the request:
apply the first template to the data definition to generate the instance of the virtual network function; and
apply the one or more assignment rules to the instance function to provision the virtual network function on a set of physical computing resources.

8. The method of claim 7, wherein the one or more components comprise one or more physical components and one or more virtual components, and wherein the instance comprises an instantiated representation of one or more physical servers that are assigned to implement the one or more physical components and an instantiated representation of one or more virtual machines operating on one or more physical servers that are assigned to implement the one or more virtual components.

9. The method of claim 7, further comprising:
using at least the first template and a second template, wherein the controller is arranged to parse the request to provision the virtual network function and select one of the first template and the second template based on the request.

10. A non-transitory computer-readable storage medium comprising a set of computer-readable instructions stored thereon, which, when executed by a processing system, cause the processing system to:
access definition data defining a virtual network function, the definition data comprising a plurality of object definitions representative of a plurality of components of the virtual network function;
instantiate the definition data to generate an instance of the virtual network function, using instructions to:
generate a representation of each of the plurality of components based on a respective one of the plurality of object definitions; and
apply one or more policy constraints to at least one of the generated representations to generate the instance; and
apply assignment logic to the generated instance to assign physical computing resources to the virtual network function,
wherein the instructions to cause the processing system to instantiate the definition data include instructions to cause the processing system to:
for a first request to provision the virtual network function, apply a first set of policy constraints to at least one of the generated representations; and
for a second request to provision the virtual network function, apply a second set of policy constraints to at least one of the generated representations.

11. The non-transitory computer-readable storage medium of claim 10, wherein the instructions to cause the processing system to generate the representation of each of the plurality of components based on the respective one of the plurality of object definitions include instructions to cause the processing system to recursively generate such that at least one of the respective one of the plurality of object definitions includes a same object nested in a recursive manner.

12. The non-transitory computer-readable storage medium of claim 10, wherein the instructions to apply assignment logic include instructions to:
for a first request to provision the virtual network function, apply a first set of assignment logic to the generated instance; and
for a second request to provision the virtual network function, apply a second set of assignment logic to the generated instance.

13. The non-transitory computer-readable storage medium of claim 10, wherein the instructions to cause the processing system to instantiate the definition by applying assignment logic to the generated instance include instructions to cause the processing system to:
obtain state information for one or more physical servers; and
determine if the state information meets the requirements of the generated instance with the one or more applied policy constraints.

14. The non-transitory computer-readable storage medium of claim 10, wherein the instructions to cause the processing system to assign physical resources to the instance of the virtual network function include instructions to cause the processing system to:
assign one or more physical servers to implement one or more physical components; and
assign one or more virtual machines operating on one or more physical servers to implement one or more virtual components.

15. The non-transitory computer-readable storage medium of claim 10, wherein the definition data comprises:
one or more artifact definitions, an artifact comprising an entity in a data model, each artifact definition comprising values for one or more attributes of the artifact; and
one or more relationship definitions representing a relationship between the one or more artifacts,
wherein each component is defined as an artifact of a specific type having one or more relationships of a specific type.

16. A computer system comprising:
a processing system; and
a non-transitory computer-readable storage medium communicatively coupled to the processing system and storing a set of computer-readable instructions, which, when executed by the processing system, cause the processing system to:
access definition data defining a virtual network function, the definition data comprising a plurality of object definitions representative of a plurality of components of the virtual network function;
instantiate the definition data to generate an instance of the virtual network function, using instructions to:
generate a representation of each of the plurality of components based on a respective one of the plurality of object definitions; and
apply one or more policy constraints to at least one of the generated representations to generate the instance; and
apply assignment logic to the generated instance to assign physical computing resources to the virtual network function,
wherein the instructions to cause the processing system to instantiate the definition data include instructions to cause the processing system to:
for a first request to provision the virtual network function, apply a first set of policy constraints to at least one of the generated representations; and
for a second request to provision the virtual network function, apply a second set of policy constraints to at least one of the generated representations.

17. The computer system of claim 16, wherein the instructions to cause the processing system to generate the representation of each of the plurality of components based on the respective one of the plurality of object definitions include instructions to cause the processing system to recursively generate such that at least one of the respective one of the plurality of object definitions includes a same object nested in a recursive manner.

18. The computer system of claim 16, wherein the instructions to apply assignment logic include instructions to:
   for a first request to provision the virtual network function, apply a first set of assignment logic to the generated instance; and
   for a second request to provision the virtual network function, apply a second set of assignment logic to the generated instance.

19. The computer system of claim 16, wherein the instructions to cause the processing system to instantiate the definition by applying assignment logic to the generated instance include instructions to cause the processing system to:
   obtain state information for one or more physical servers; and
   determine if the state information meets the requirements of the generated instance with the one or more applied policy constraints.

20. The computer system of claim 16, wherein the instructions to cause the processing system to assign physical resources to the instance of the virtual network function include instructions to cause the processing system to:
   assign one or more physical servers to implement one or more physical components; and
   assign one or more virtual machines operating on one or more physical servers to implement one or more virtual components.

* * * * *